July 31, 1934.                H. A. GARDNER                1,968,136
                                DISINFECTING
                             Filed May 18, 1933
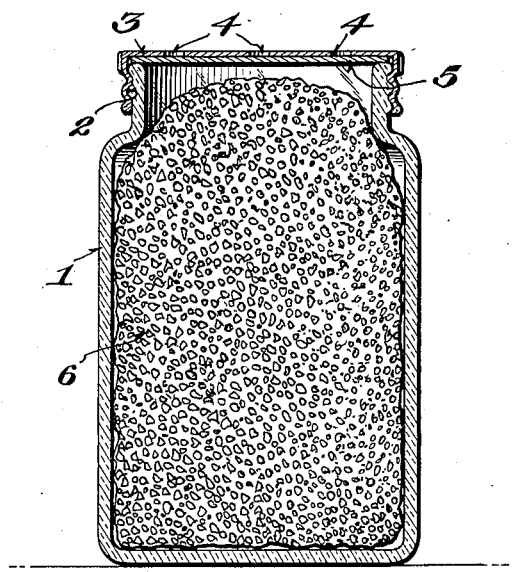
Inventor
Henry A. Gardner,
By K. P. McElroy
Attorney

UNITED STATES PATENT OFFICE 1,968,136

DISINFECTING

Henry A. Gardner, Washington, D. C.

Application May 18, 1933, Serial No. 671,754

10 Claims. (Cl. 299—24)

This invention relates to disinfecting; and it comprises a method of utilizing orthodichlorbenzene as a disinfectant and insecticide wherein the orthodichlorbenzene is taken up in a rubber sponge from which it is allowed to evaporate when its services are required; and it also comprises a glass jar provided with a removable seal and containing a porous rubber sponge charged with orthodichlorbenzene; all as more fully hereinafter set forth and as claimed.

In chlorinating benzene, both orthodichlorbenzene and paradichlorbenzene are necessarily produced. The former was originally the main product and the latter a byproduct for which uses were sought. Latterly, the para body has come into wide use as an insecticide and it is now made as a main product. Orthodichlorbenzene has become a byproduct seeking a market. The para body is a volatile solid, something like camphor or naphthalene, etc., and has valuable and well recognized powers as an insecticide. Because of its physical properties, it is convenient to ship, use and store. The ortho body, being a liquid, is not as conveniently handled and is, therefore, not much used as an insecticide, in spite of its insecticidal value; a value as great as that of the para body and, perhaps, superior. It is also valuable as a general disinfectant.

I have found that orthodichlorbenzene is readily absorbed by rubber, going into what is apparently a true solid solution; the solid rubber acting as solvent for the liquid; the volatile liquid orthodichlorbenzene becoming solute in a solid solvent. From the charged rubber, it readily evaporates and, in a way, the rubber can be regarded as a means of immobilizing the liquid; of rendering its use possible where liquid is not permissible, as in protecting clothing, etc., against moths. Rubber will take up some five times its weight of orthodichlorbenzene, swelling greatly but not losing its form or becoming plasticized. The most convenient form of rubber to use for this purpose is the ordinary commercial spongy rubber, since it has enormous surface. A rubber sponge charged with all the orthodichlorbenzene it will take up retains its porosity. Good commercial sponge rubber will take up and retain something like 520 per cent by weight of liquid orthodichlorbenzene before free liquid appears; a 25 gram sponge taking up 130 grams of the liquid without stoppage of its pores and without damaging it. Different commercial rubbers vary somewhat in their absorbent powers and some grades will take up 150 grams of orthodichlorbenzene in a 25 gram sponge.

From the surfaces of a charged sponge, the ortho body slowly evaporates. The present invention therefore offers a convenient and useful method of disinfecting and of killing insects; a sponge being charged with the ortho body and placed in the location where the fumes are wanted. By placing a small rubber sponge in a glass jar and pouring in a little of the ortho body, it is taken up by the rubber which swells to fill the jar, if the right size of sponge be used. As the ortho body evaporates in use, the sponge shrinks again and finally regains its original volume. It may then be charged with a little more of the ortho body and again used, and so on indefinitely.

In the accompanying illustration, I have shown, more or less diagrammatically, an embodiment of the described invention. The figure is a central vertical section of a disinfecting apparatus embodying my invention.

In this showing, an open jar 1, advantageously of glass, is provided as shown with screw threads 2. A cover 3, advantageously made of metal and provided with screw threads corresponding to those on the jar, covers the jar as shown. The cover is provided with openings 4 to allow escape of vapors from the jar. A sealing disk 5, ordinarily of cardboard, is positioned between the cover and the jar to seal the jar during storage and shipment, before the apparatus is put in service. It is removed or perforated when the functions of the ortho body are wanted. In the jar is positioned a swollen rubber sponge 6 substantially filling the jar as shown. The sponge is saturated with orthodichlorbenzene when the apparatus is assembled. Afterward, when the orthodichlorbenzene has disappeared, a new lot is simply poured in on the shrunken sponge.

The rubber sponge used in the present apparatus may be charged with other volatile and liquid disinfectants, antiseptics and insecticides, among them being pine oil and liquid phenols. The present invention can be used with any of these liquids which is absorbed by rubber and does not plasticize it to form a rubber cement. The use of volatile liquids which do plasticize rubber, such as benzol, is permissible, provided the amount be restricted to that which will be taken up without changing the form of the rubber sponge. Swollen rubber may be made with non-volatile hydrocarbons and the swollen rubber used to take up small amounts of volatile disinfectants, perfumes, etc.

What I claim is:—

1. In the treatment of air with vapors of a volatile organic insecticidal and disinfectant liquid, the process of immobilizing the liquid which comprises taking up the liquid in rubber to form a solid solution and exposing the charged rubber to the air to be treated.

2. The process of claim 1 in which the rubber is in the form of rubber sponge.

3. The process of claim 1 in which the volatile organic disinfectant liquid is orthodichlorbenzene.

4. In the use of liquid orthodichlorbenzene as a volatile insecticide and antiseptic, the process of immobilizing the orthodichlorbenzene which comprises taking up the liquid in rubber to form a solid solution and exposing the charged rubber to an atmosphere to be treated with the vapors.

5. In disinfecting apparatus of the type comprising a jar and a temporary seal which, when broken, exposes the contents of the jar to the air, the improvement which comprises a rubber sponge placed in the jar and containing a volatile organic disinfectant liquid in solid solution in the rubber substance.

6. In the apparatus of claim 5, orthodichlorbenzene contained in the rubber sponge.

7. In insecticidal and disinfectant means, spongy rubber carrying orthodichlorbenzene in solid solution in the rubber substance.

8. In insecticidal and disinfectant means, spongy rubber carrying orthodichlorbenzene in solid solution in the rubber substance in a ratio by weight between 3 and 5 to 1.

9. Insecticidal and disinfectant material comprising rubber carrying a volatile organic insecticidal and disinfectant liquid in solid solution in the rubber substance.

10. A solid insecticide and disinfectant comprising rubber carrying orthodichlorbenzene in solid solution in the rubber substance.

HENRY A. GARDNER.